US009731606B1

(12) United States Patent
Gubel et al.

(10) Patent No.: US 9,731,606 B1
(45) Date of Patent: Aug. 15, 2017

(54) REDUNDANT CIRCUIT DISCONNECTION FOR ELECTRIC VEHICLES

(71) Applicant: Faraday & Future Inc., Gardena, CA (US)

(72) Inventors: Caio D. Gubel, San Clemente, CA (US); Phillip John Weicker, Pasadena, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 73 days.

(21) Appl. No.: 15/093,101

(22) Filed: Apr. 7, 2016

Related U.S. Application Data

(63) Continuation of application No. 15/005,862, filed on Jan. 25, 2016.

(51) Int. Cl.

| | |
|---|---|
| ***H02H 5/04*** | (2006.01) |
| ***B60L 3/00*** | (2006.01) |
| ***H01H 85/055*** | (2006.01) |
| *H01H 9/10* | (2006.01) |
| *H02H 7/08* | (2006.01) |
| *H02H 9/02* | (2006.01) |
| *H02H 3/04* | (2006.01) |

(52) U.S. Cl.
CPC ......... *B60L 3/0092* (2013.01); *H01H 85/055* (2013.01); *H01H 9/102* (2013.01); *H02H 3/046* (2013.01); *H02H 7/0844* (2013.01); *H02H 9/02* (2013.01)

(58) Field of Classification Search
CPC .......... H02H 3/05; H02H 7/18; B60L 3/0092; H01H 85/0039; H01H 85/0047; H01H 85/0056; H01H 85/055
USPC ................................ 361/1, 11, 23, 103, 106
See application file for complete search history.

(56) References Cited

U.S. PATENT DOCUMENTS

| | | | | |
|---|---|---|---|---|
| 3,594,740 | A * | 7/1971 | Comeau | G21C 17/12 340/686.1 |
| 5,084,691 | A * | 1/1992 | Lester | H01H 61/00 337/166 |
| 5,552,338 | A | 9/1996 | Kang | |
| 6,538,550 | B1 | 3/2003 | Muench, Jr. et al. | |
| 7,271,643 | B2 | 9/2007 | Robinson et al. | |
| 8,421,520 | B2 | 4/2013 | Choi | |
| 8,829,716 | B2 * | 9/2014 | Tinglow | H02J 7/0016 307/65 |

(Continued)

FOREIGN PATENT DOCUMENTS

WO WO 2011/157068 A1 12/2011

*Primary Examiner* — Danny Nguyen
(74) *Attorney, Agent, or Firm* — Knobbe, Martens, Olson & Bear LLP

(57) ABSTRACT

Systems and methods for redundant circuit disconnection in electric vehicles are disclosed. Systems can include a resistive metallic fuse connected within an electrical circuit for a battery or otherwise, an inductor comprising a coil of at least one turn of wire about a longitudinal axis, and an AC power source configured to provide an alternating current across the inductor. The resistive metallic fuse may be disposed within the inductor along the longitudinal axis, and the AC power source may be configured to cause the inductor to induce within the resistive metallic fuse eddy currents of sufficient magnitude to melt or vaporize at least a portion of the resistive metallic fuse disposed therein.

20 Claims, 4 Drawing Sheets

102
104
108
110
112
106
100
114

(56) References Cited

U.S. PATENT DOCUMENTS

2016/0079755 A1 * 3/2016 Triebel ...................... H02J 3/32
307/52

* cited by examiner 200
204
202
210
206
208
AC

REDUNDANT CIRCUIT DISCONNECTION FOR ELECTRIC VEHICLES

INCORPORATION BY REFERENCE OF PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. application Ser. No. 15/005,862, filed Jan. 25, 2016, entitled "REDUNDANT CIRCUIT DISCONNECTION FOR ELECTRIC VEHICLES," which is hereby expressly incorporated by reference in its entirety and for all purposes.

BACKGROUND

Field

This disclosure relates to vehicle battery systems, and more specifically to systems and methods for redundant battery disconnect protection with induction-heated fuses.

Description of the Related Art

Electric vehicle batteries are typically protected by magnetic contactors allowing the battery circuit to be opened when necessary. In some battery systems, two contactors may be provided in series in order to provide redundancy, allowing the circuit to be opened if one contactor becomes welded or otherwise stuck in the closed position.

SUMMARY

The systems and methods of this disclosure each have several innovative aspects, no single one of which is solely responsible for its desirable attributes. Without limiting the scope as expressed by the claims that follow, its more prominent features will now be discussed briefly.

In one embodiment, a redundant disconnection system for use in an electrical circuit is described. The system may include a switch. The system may further include a resistive metallic fuse connected within the electrical circuit in series with the switch, and an inductor including a coil of at least one turn of wire about a longitudinal axis. The system may also include an AC power source configured to provide an alternating current across the inductor. The resistive metallic fuse may be disposed within the conductor along the longitudinal axis, and the AC power source may be configured to cause the inductor to induce within the resistive metallic fuse eddy currents of sufficient magnitude to melt or vaporize at least a portion of the resistive metallic fuse.

In another embodiment, a redundant disconnection method for use in an electrical circuit is described. The method may include providing a switch connected within the electrical circuit, providing a resistive metallic fuse connected within the electrical circuit in series with the switch, and providing an inductor comprising at least one turn of wire wound about the resistive metallic fuse. The method may further include commanding the switch to open the electrical circuit, detecting a failure of the switch to open the electrical circuit, and applying an alternating current through the inductor. The alternating current applied through the inductor may induce within the resistive metallic fuse eddy currents of sufficient magnitude to melt or vaporize at least a portion of the resistive metallic fuse.

In another embodiment, a vehicle with redundant battery protection is described. The vehicle may include at least one electrical circuit, at least one battery connected within the electrical circuit, and a switch connected within the electrical circuit in series with the battery. The vehicle may also include a resistive metallic fuse connected within the electrical circuit in series with the battery and the switch, an inductor including a coil of at least one turn of wire about a longitudinal axis, and an AC power source configured to provide an alternating current across the inductor. The resistive metallic fuse may be disposed within the inductor along the longitudinal axis, and the AC power source may be configured to cause the inductor to induce within the resistive metallic fuse eddy currents of sufficient magnitude to melt or vaporize at least a portion of the resistive metallic fuse.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations are merely examples and are not intended to be limiting. Throughout the drawings, similar symbols typically identify similar components, unless context dictates otherwise.

DETAILED DESCRIPTION OF THE PREFERRED EMBODIMENT

The following description is directed to certain implementations for the purpose of describing the innovative aspects of this disclosure. However, a person having ordinary skill in the art will readily recognize that the teachings herein can be applied in a multitude of different ways. The described implementations may be implemented in any electrical circuit. In some implementations, the word "battery" or "batteries" will used to describe certain elements of the embodiments described herein. It is noted that "battery" does not necessarily refer to only a single battery cell. Rather, any element described as a "battery" or illustrated in the Figures as a single battery in a circuit diagram may equally be made up of any larger number of individual battery cells without departing from the spirit or scope of the disclosed systems and methods.

Figure 1:
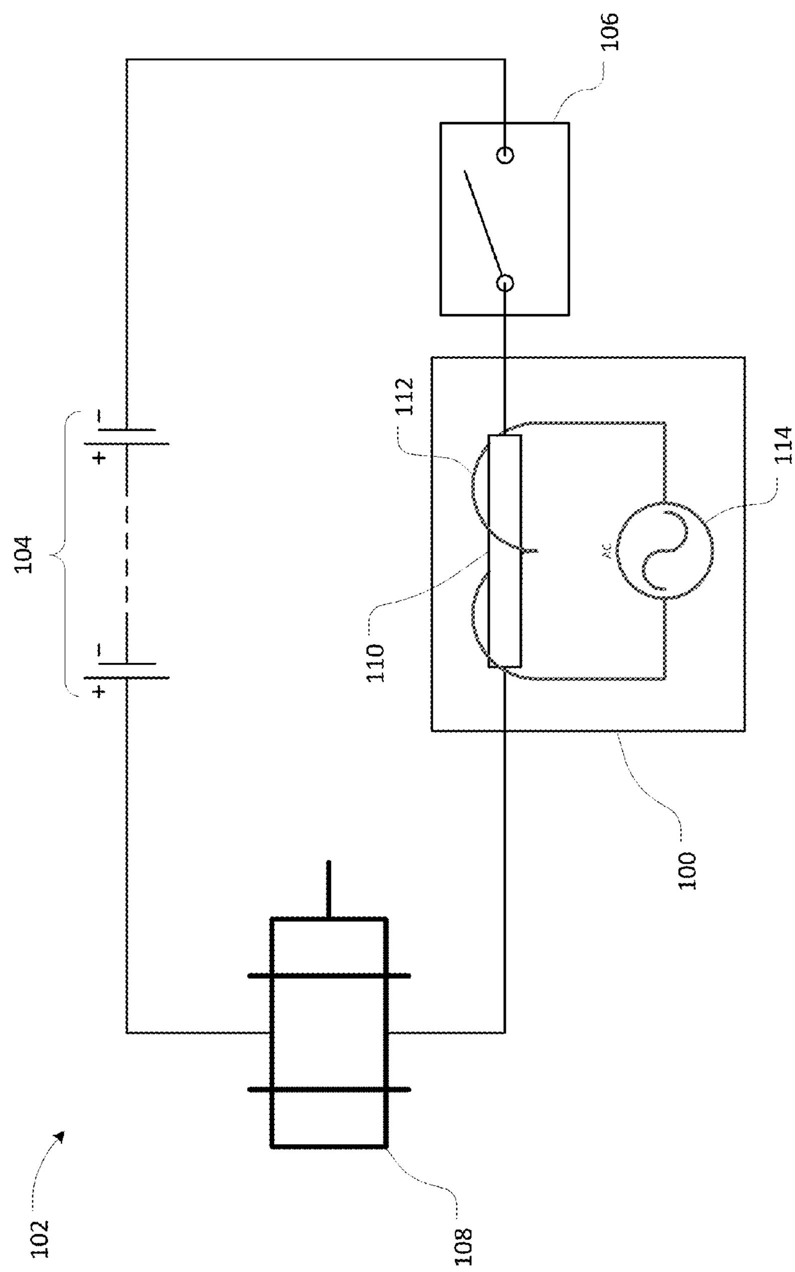
FIG. 1 is a circuit diagram depicting a redundant disconnection system in a simple battery circuit in accordance with an exemplary embodiment.

FIG. 1 is a circuit diagram depicting a redundant disconnection device 100 in a simple battery circuit 102 in accordance with an exemplary embodiment. In some embodiments, a circuit 102 may include at least one battery 104 and a primary disconnector 106, such as a magnetic contactor or any other type of electrical switch capable of opening and closing a circuit. In some embodiments, a battery circuit may further comprise an electric motor 108. The electric motor 108 may include a DC electric motor, a combination of an AC electric motor and a power inverter, or any other type of motor or motor system capable of drawing power from a DC circuit.

A contactor or other electrical switch 106 is susceptible to occasional failure, such as by welding or other mechanical failure. Such a failure may prevent an open switch 106 from closing, or it may prevent a closed switch 106 from opening. When switch 106 is closed and a mechanical failure prevents switch 106 from opening, a redundant disconnection device 100 may be able to disrupt the circuit 102 instead.

Redundant disconnection device 100, described in greater detail below with reference to FIG. 3, may include a resistive metallic fuse 110. The fuse 110 may be disposed within a wire coil 112, which may be electrically and/or thermally isolated from the fuse 110 and the DC circuit 102. As described below, the fuse may have a rated current sufficient to carry at least the DC current regularly flowing through the fuse 110 during ordinary operation of the DC battery circuit 102. The two ends of the wire coil 112 may be connected across an AC power source 114 configured to generate an alternating current through the wire of the coil 112. As will be described below, the AC power source may be able to generate an alternating current with sufficient magnitude to induce enough eddy current to melt or vaporize the fuse 110.

In some embodiments, fuse 110 may be connected within the DC circuit 102 in series with the at least one battery 104 so that there is no possible closed circuit path through the at least one battery 104 that bypasses the fuse 110. Thus, after the AC power source 114 is activated and the fuse 110 has melted or vaporized, the DC battery circuit 102 is open because current is no longer able to flow through the fuse 110.

Figure 2:
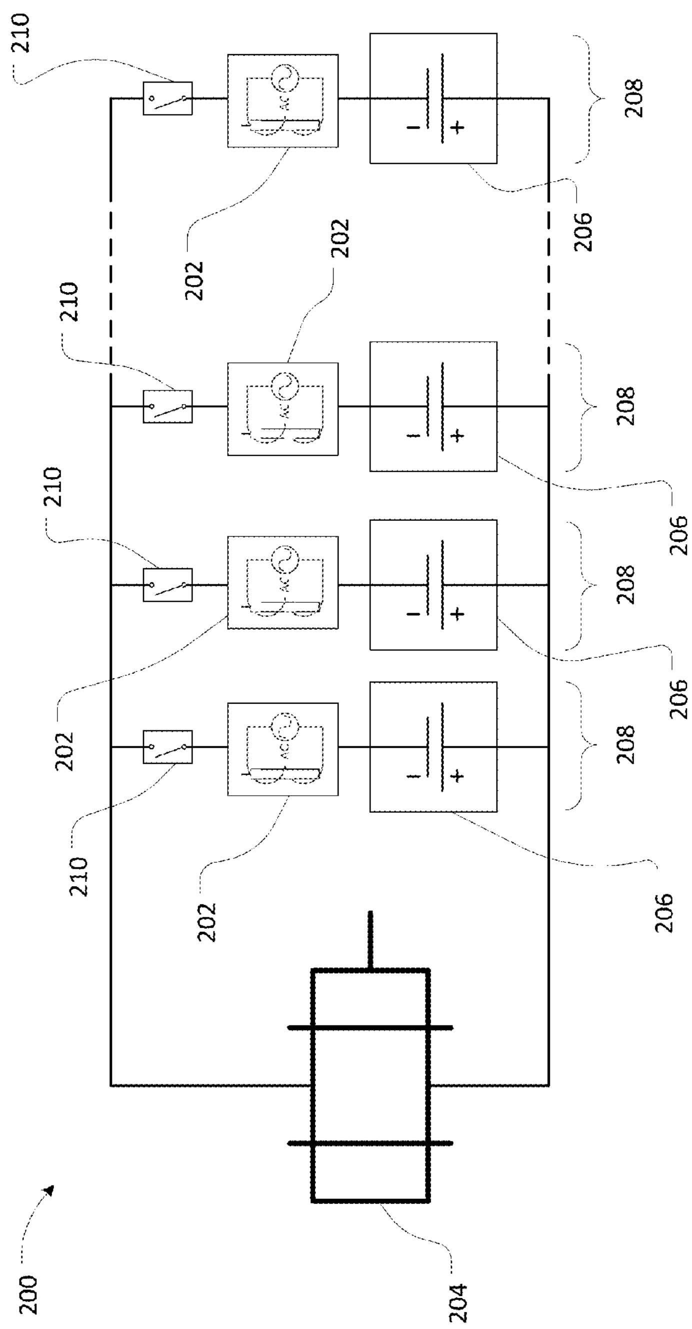
FIG. 2 is a circuit diagram depicting an example configuration of multiple redundant disconnection systems in a multi-string electric vehicle battery circuit in accordance with an exemplary embodiment.

FIG. 2 is a circuit diagram depicting an example configuration of multiple redundant disconnection systems 202 in a multi-string electric vehicle battery circuit 200 in accordance with an exemplary embodiment. The multi-string electric vehicle battery circuit 200 may include at least one electric motor 204. Motor 204 may be any type of motor capable of drawing power from a DC battery circuit, such as a DC motor or a combination of an AC motor and a power inverter. In some embodiments, motor 204 may include one or more motors of an electronic vehicle powertrain, or may include motors configured for non-powertrain functions.

In various embodiments, battery circuit 200 may include a single battery 206, or multiple batteries 206. In some embodiments, as many as six or more batteries 206 may be included in a battery circuit 200 in order to provide a large amount of power to the motor 204 or to provide redundancy in case one or more batteries 206 are damaged, discharged, malfunctioning, or otherwise unable to safely provide power to the motor. In some embodiments, multiple batteries 206 may be arranged in separately switchable strings 208. Each battery string 208 may comprise at least one battery 206, and at least one switch 210 for removing the at least one battery 206 from the current in the battery circuit. A switch 210 may be any device capable of opening an electrical circuit. For example, in some embodiments the switch 210 may be a magnetic contactor or a mechanically operated switch. In some embodiments, any number of switches 210 may be actuated automatically by a battery management system, string management system, or other type of computer device configured to control or protect the battery circuit 200.

In a complex battery circuit 200 including multiple strings 208 of batteries 206, the failure of a switch 210 to operate when desired may cause a significant risk of damage. This risk is especially great when the batteries 206 are high-voltage batteries capable of powering an electric vehicle powertrain. Engaging battery strings 208 with the main battery circuit 200 in the wrong order, engaging a string 208 containing a damaged or malfunctioning battery 206, or allowing a battery string 208 to remain connected within the battery circuit 200 when it should be disconnected for any safety or performance-related reason, may cause damage to the motor 204 or to other batteries 206. These conditions may also cause damage to other parts of an electric vehicle, and may even create a risk of bodily harm to occupants of the vehicle or others nearby, as serious battery malfunctions may cause fire or explosion.

The risks related to failure of a switch 210 in a battery string 208 may be significantly reduced by including a redundant disconnection device 202 in each string 208, in series with the switch 210 and battery 206. Various types of redundant disconnection devices 202 may be used. In some embodiments, a redundant disconnection device 202 could be a contactor. However, extra contactors are fairly large and add cost. Providing two contactors in the battery circuit may add significant weight and cost to a vehicle if the vehicle contains multiple battery circuits. Additionally, the benefit of including a second contactor in the battery circuit is relatively small because the second contactor is equally susceptible to welding or other failure as the first contactor in the circuit.

In some embodiments, the redundant disconnection device 202 may be an induction-blowable fuse device as described above with reference to FIG. 1 and below with reference to FIG. 3. If the redundant disconnection device 202 is an induction-blowable fuse, the required AC current may be derived from a number of possible sources. In some embodiments, each disconnection device 202 may have its own AC power source. In some embodiments, the disconnection devices 202 may draw AC power from a single source. The single AC power source may be an inverter providing AC current to the motor 204, an inverter coupled to other high-voltage battery strings 208, an inverter coupled to a separate lower-voltage power source for other vehicle systems, an AC induction motor configured for regenerative braking, or any other AC power source that may be located within an electric vehicle.

Figure 3:
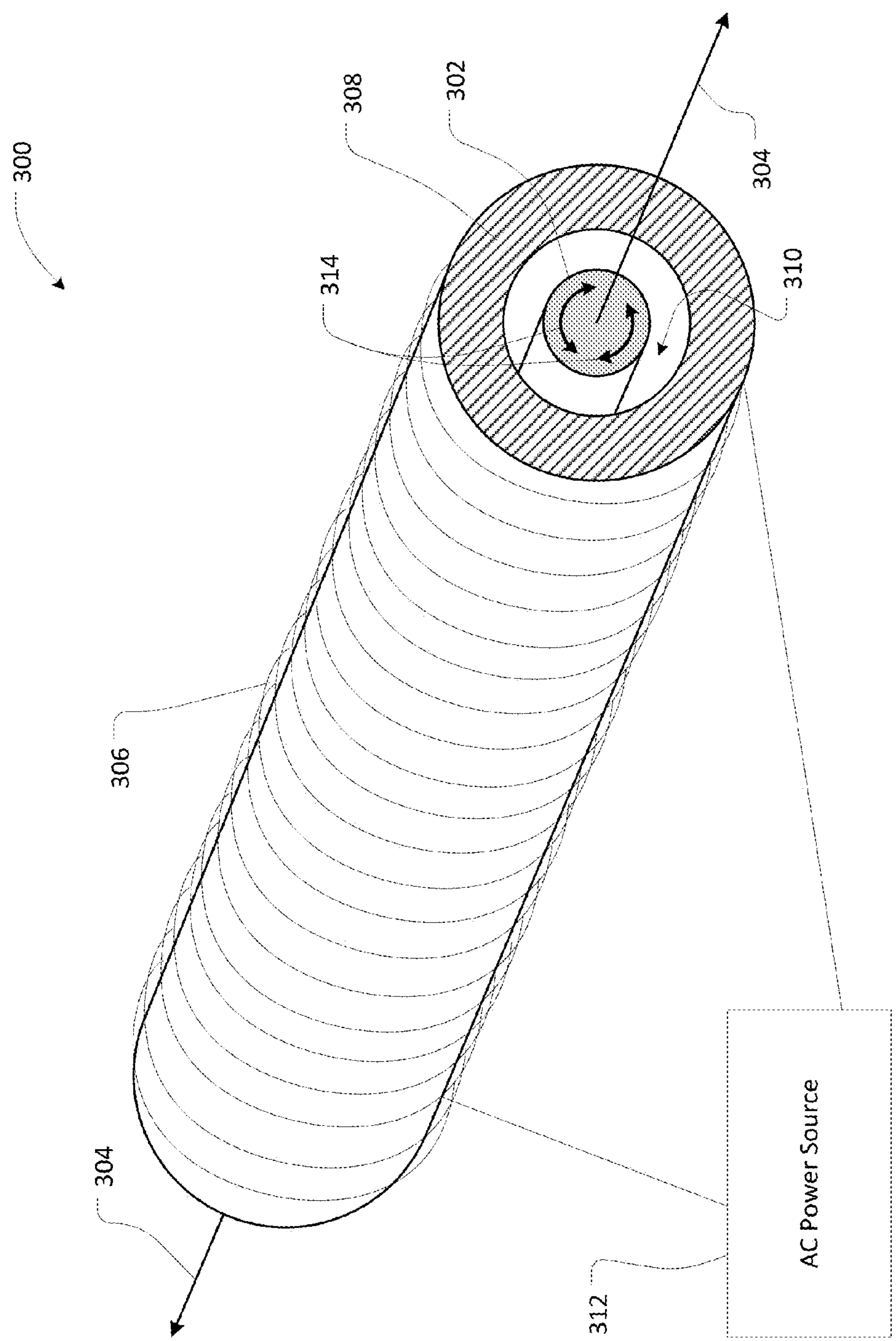
FIG. 3 depicts a detail view of an induction-heated blowable fuse device for use in a redundant circuit disconnection system in accordance with an exemplary embodiment.

FIG. 3 depicts a cross-sectional view of an induction-heated blowable fuse device 300 in accordance with an exemplary embodiment. In some embodiments, the device 300 may include a central resistive metallic fuse 302. The central resistive metallic fuse 302 may be connected within a battery circuit such that current may flow through the resistive metallic fuse 302 during ordinary operation of the battery circuit. Thus, the resistive metallic fuse 302 should have a rated current high enough to carry at least the ordinary current 302 occurring during ordinary operation of the battery circuit.

The resistive metallic fuse 302 may be disposed along the longitudinal axis 304 of a wire coil 306. In some embodiments, the wire coil 306 may include a single loop of wire. In other embodiments, the wire coil 306 may include two or more loops, up to dozens, hundreds, or thousands of loops. The coil 306 may be composed of wire of any metal capable of conducting electricity. In some embodiments, the coil 306 may be made of copper wire. In some embodiments, the coil 306 may be wound around a solid insulator 308 composed of an electrically insulating material. For example, in some embodiments the insulator 308 may be made of a ceramic. In some embodiments, the insulator 308 may include a plastic, glass, or any other electrically insulating material. In some embodiments, the insulator 308 may be composed of a material that is both electrically and thermally insulating.

In some embodiments, the insulator 308 may be in the form of a hollow tube surrounding the resistive metallic fuse 302. The insulator 308 may be immediately surrounding the resistive metallic fuse 302. In other embodiments, an air gap 310 may be disposed between the insulator 308 and the resistive metallic fuse 302. An air gap 310 may improve the function of the device 300 by allowing space for the dissipation of material released by the melting or vaporization of at least a portion of the resistive metallic fuse 302.

When blowing the fuse 302 is desired, an alternating current may be applied through the wire coil 306 by an AC power source 312. When a changing electrical current, such as a standard sinusoidal alternating current, flows through a wire loop or coil of multiple wire loops, a magnetic field is created flowing through the loop. In the case of a wire coil 306 consisting of multiple loops of wire, the current within each loop adds to the overall magnetic field created through the coil 306. Because an alternating current varies sinusoidally in magnitude and direction, the magnetic field will not remain constant, but will also vary sinusoidally with time. Thus, if the resistive metallic fuse 302 is disposed within the wire coil 306 along its longitudinal axis 304, the fuse 302 will be exposed to a magnetic field oriented along the longitudinal axis 304. However, this magnetic field will be constantly changing in magnitude.

Generally, subjecting a conducting material to a time-varying magnetic field induces eddy currents in the conducting material. Eddy currents occur naturally as a result of the electric field associated with the time-varying magnetic field within the conductor. Eddy currents flow in planes perpendicular to the magnetic field and behave generally like closed loops of current within these perpendicular planes. Thus, when the resistive metallic fuse 302 is exposed to a sinusoidally time-varying magnetic field along the longitudinal axis 304, eddy currents 314 will flow circumferentially within the fuse 302, in planes perpendicular to the longitudinal axis 304.

The amount of eddy current 314 induced is directly related to the magnitude of the time-varying magnetic field. The magnitude of the time-varying magnetic field in turn is directly related to the magnitude of the alternating electric current in the induction coil 306. Accordingly, a high-magnitude alternating current within the induction coil 306 may induce sufficient current in the resistive metallic fuse 302 to create significant resistive heating within the fuse 302. Resistive heating may cause the fuse 302 to melt or vaporize in a similar manner to a conventional electrical fuse, interrupting the battery circuit.

In some embodiments, the resistive metallic fuse 302 may be a part of a battery circuit of an electric vehicle. In some embodiments, the battery circuit may be a high-voltage battery circuit configured to provide electrical power for the vehicle powertrain. In high-current applications such as an electric vehicle powertrain, the fuse 302 should preferably have a rated current sufficient to carry the current required for operation of the powertrain. In some embodiments, operation of the powertrain may require a current of up to several hundred amps flowing through a battery circuit. In embodiments where the fuse 302 has a rated current in the range of 300 amps, the induced eddy currents 314 may have a root mean square (RMS) value in the range of 500 to 600 amps to cause the necessary melting or vaporization in approximately 0.1 to 100 milliseconds through resistive heating. Various embodiments of the induction coil 306 and AC power source 312 may produce eddy currents of this magnitude. For example, a coil including 1000 turns of 30 gauge wire may produce the necessary amount of eddy current when the current in the induction coil has an RMS value of 25 milliamps at frequency 150 kilohertz. Accordingly, the AC power source 312 providing the alternating current to the wire coil 306 may be powerful enough to provide at least the necessary amount of AC current.

Figure 4:
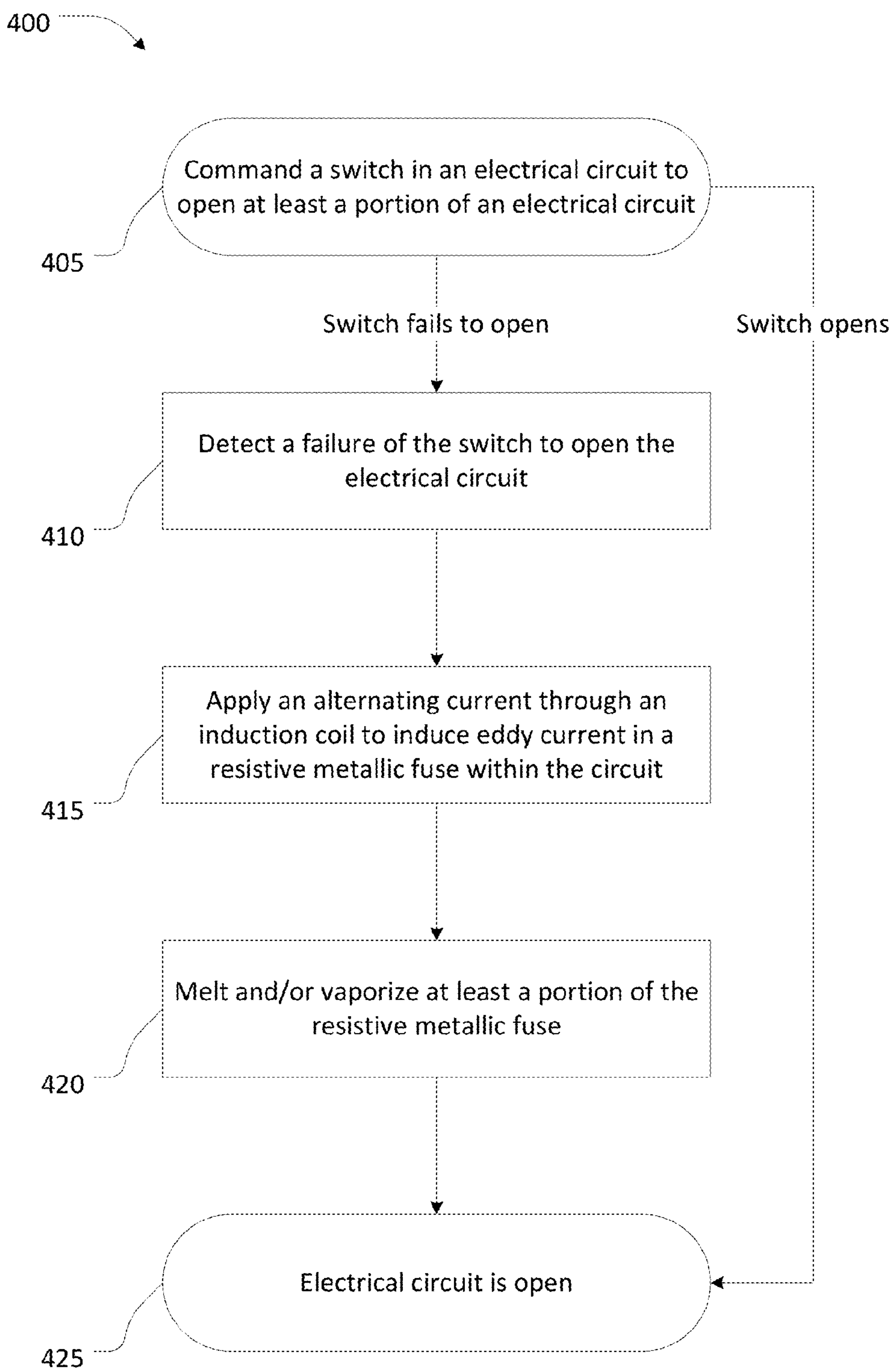
FIG. 4 is a flowchart depicting a redundant disconnection method for an electrical circuit in accordance with an exemplary embodiment.

FIG. 4 is a flowchart depicting a redundant disconnection method 400 for an electrical circuit in accordance with an exemplary embodiment. In some embodiments, the method 400 may be employed with induction-blowable fuse devices as described above with reference to FIGS. 1 and 3. In some embodiments, the method 400 may be used in simple or complex battery circuits as described above with reference to FIGS. 2 and 3.

The method 400 may begin at block 405, where a switch in an electrical circuit is commanded to open at least a portion of the electrical circuit. In some embodiments, the relevant switch may be configured to stop all current in the circuit when opened. In some embodiments, the switch may be in a branch of a parallel circuit, so that its opening will stop current from flowing through one branch of the circuit while allowing current to continue or begin flowing through other parallel branches of the circuit. In the case of a multi-string electric vehicle battery circuit, the command to open a portion of the circuit may be given for various reasons, including detection of a battery malfunction in one string, routine activation and deactivation of battery strings, or any other reason requiring a single battery to be switched out of the battery circuit current.

After the command to open a switch is given, the method 400 may continue to block 410 or block 425. If the switch opens as commanded, the method 400 may continue to block 425, where the circuit or portion of a circuit is open, current stops flowing, and the method 400 may terminate. However, if the switch fails to open as commanded, the method 400 may continue to block 410, where the failure may be detected. The failure of a switch to open in response to an open command may be detected in various ways. In some embodiments, a current detector may measure a continued current through the string, either directly or through a shunt, to determine that the circuit has not been opened by the switch. In some embodiments, a sensor may be able to detect a physical position of the switch in a closed position, or otherwise determine that the switch remains closed after the open command is delivered.

After the failure of the switch to open the electrical circuit is detected, the method 400 may continue to block 415, where an AC current is applied through an induction coil to induce eddy current in a resistive metallic fuse within the circuit. In some embodiments, the resistive metallic fuse and induction coil may be configured as described above with reference to FIGS. 1 and 3. The amount of AC current may be determined at least in part based on the amount of DC current already flowing through the fuse and the rated current of the fuse. The amount of AC current may be determined so as to induce eddy current in the fuse sufficient to exceed the rated current of the fuse.

After an AC current is applied through an induction coil, the method may continue to block 420, where at least a portion of the resistive metallic fuse is melted and/or vaporized. The melting and/or vaporization of at least a portion of the resistive metallic fuse may occur shortly after the AC current is applied due to the nearly immediate induction of eddy currents exceeding the rated current of the fuse. The melting and/or vaporization may occur as a result of resistive heating caused by the eddy currents flowing circumferentially within the metal of the fuse, as described above with reference to FIG. 3. Because the eddy currents flow circumferentially, no additional current will be added to the existing DC current within the fuse. When a portion of the fuse melts and/or vaporizes due to inductive heating, the melted and/or vaporized metal may move. For example, melted metal may flow along the fuse and/or other circuitry or fall into an air gap as a result of gravity. In some embodiments, where an air gap is present between the fuse and a surrounding insulator, vaporized metal may be propelled outward across the air gap from its original location in the fuse and may collect or be deposited on the interior surface of a surrounding insulator. In addition, some vaporized fuse metal may be expelled from the fuse assembly entirely.

After at least a portion of the resistive metallic fuse is melted and/or vaporized, the method 400 may continue to block 425, where the electrical circuit is open and the method terminates. Here, the outcome is effectively the same as if the switch had opened as commanded in block 405. The melted and/or vaporized portion of the fuse may have changed the geometry of the fuse so as to create a gap in the electrical circuit. Thus, the circuit will be open, and current will stop flowing through the portion of the circuit containing the fuse. Repairs may later be performed including replacing or repairing the blown fuse. In some embodiments, fuse repairs may be performed in addition to or concurrent with repairs to the battery or battery string, which may in some embodiments address battery damage or malfunction which required the fuse to be blown.

It is noted that the examples may be described as a process. Although the operations may be described as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present disclosed process and system. Various modifications to these implementations will be readily apparent to those skilled in the art, and the generic principles defined herein may be applied to other implementations without departing from the spirit or scope of the disclosed process and system. Thus, the present disclosed process and system is not intended to be limited to the implementations shown herein but is to be accorded the widest scope consistent with the principles and novel features disclosed herein.

What is claimed is:

1. A redundant disconnection system for use in an electrical circuit, the system comprising:
- a switch;
- a resistive metallic fuse connected within the electrical circuit in series with the switch;
- an inductor comprising a coil of at least one turn of wire about a longitudinal axis; and
- an AC power source configured to provide an alternating current through the inductor;
- wherein the resistive metallic fuse is disposed within the inductor along the longitudinal axis, and the AC power source is configured to cause the inductor to induce eddy currents within the resistive metallic fuse, the eddy currents having a root mean square amplitude greater than the root mean square amplitude of the alternating current through the inductor and being of sufficient magnitude to melt or vaporize at least a portion of the resistive metallic fuse disposed therein.

2. The redundant disconnection system of claim 1, wherein the switch is a magnetic contactor.

3. The redundant disconnection system of claim 1, further comprising a layer of electrically insulating material disposed between the resistive metallic fuse and the inductor.

4. The redundant disconnection system of claim 3, further comprising an air gap disposed between the resistive metallic fuse and the layer of electrically insulating material.

5. The redundant disconnection system of claim 1, wherein the coil comprises a plurality of turns of wire.

6. The redundant disconnection system of claim 1, further comprising a battery connected within the electrical circuit in series with the switch and the resistive metallic fuse.

7. The redundant disconnection system of claim 6, wherein the system further comprises a plurality of separately switchable parallel battery strings, and wherein each battery string comprises:
- a battery;
- a switch connected in series with the battery;
- a resistive metallic fuse connected in series with the switch and the battery;
- an inductor comprising a coil of at least one turn of wire about a longitudinal axis; and
- an AC power source configured to provide an alternating current through the inductor;
- wherein the resistive metallic fuse is disposed within the inductor along the longitudinal axis, and the AC power source is configured to cause the inductor to induce eddy currents within the resistive metallic fuse, the eddy currents having a root mean square amplitude greater than the root mean square amplitude of the alternating current through the inductor and being of sufficient magnitude to melt or vaporize at least a portion of the resistive metallic fuse disposed therein.

8. The redundant disconnection system of claim 7, wherein the switch is a magnetic contactor.

9. A redundant disconnection method for use in an electrical circuit, the method comprising:
- providing a switch connected within the electrical circuit;
- providing a resistive metallic fuse connected within the electrical circuit in series with the switch;
- providing an inductor comprising a coil of at least one turn of wire wound about the resistive metallic fuse;
- commanding the switch to open the electrical circuit;
- detecting a failure of the switch to open the electrical circuit; and
- applying an alternating current through the inductor;
- wherein the alternating current in the inductor induces eddy currents within the resistive metallic fuse, the eddy currents having a root mean square amplitude greater than the root mean square amplitude of the alternating current through the inductor and being of sufficient magnitude to melt or vaporize at least a portion of the resistive metallic fuse.

10. The redundant disconnection method of claim 9, wherein the switch is a magnetic contactor.

11. The redundant disconnection method of claim 9, wherein the coil comprises a plurality of turns of wire.

12. The redundant disconnection method of claim 9, further comprising providing a battery connected within the electrical circuit in series with the switch and the resistive metallic fuse.

13. The redundant disconnection method of claim 12, wherein the step of commanding the switch to open the electrical circuit is performed in response to a malfunction of the battery.

14. A vehicle with redundant battery protection, the vehicle comprising:

at least one electrical circuit at least one battery connected within the electrical circuit;

a switch connected within the electrical circuit in series with the battery;

a resistive metallic fuse connected within the electrical circuit in series with the battery and the switch;

an inductor comprising a coil of at least one turn of wire about a longitudinal axis; and an AC power source configured to provide an alternating current through the inductor;

wherein the resistive metallic fuse is disposed within the inductor along the longitudinal axis, and the AC power source is configured to cause the inductor to induce eddy currents within the resistive metallic fuse, the eddy currents having a root mean square amplitude greater than the root mean square amplitude of the alternating current through the inductor and being of sufficient magnitude to melt or vaporize at least a portion of the resistive metallic fuse disposed therein.

15. The vehicle of claim 14, wherein the switch is a magnetic contactor.

16. The vehicle of claim 14, further comprising a layer of electrically insulating material disposed between the resistive metallic fuse and the inductor.

17. The vehicle of claim 14, further comprising an air gap disposed between the resistive metallic fuse and the layer of electrically insulating material.

18. The vehicle of claim 14, wherein the coil comprises a plurality of turns of wire.

19. The vehicle of claim 14, wherein the vehicle further comprises a plurality of separately switchable parallel battery strings, and wherein each battery string comprises:

a battery;

a switch connected in series with the battery;

a resistive metallic fuse connected in series with the switch and the battery;

an inductor comprising a coil of at least one turn of wire about a longitudinal axis; and an AC power source configured to provide an alternating current through the inductor;

wherein the resistive metallic fuse is disposed within the inductor along the longitudinal axis, and the AC power source is configured to cause the inductor to induce eddy currents within the resistive metallic fuse, the eddy currents having a root mean square amplitude greater than the root mean square amplitude of the alternating current through the inductor and being of sufficient magnitude to melt or vaporize at least a portion of the resistive metallic fuse disposed therein.

20. The vehicle of claim 19, wherein the switch is a magnetic contactor.

* * * * *